United States Patent [19]

Pritchard et al.

[11] 4,224,638

[45] Sep. 23, 1980

[54] FREQUENCY MULTIPLIER FOR USE WITH CCD COMB FILTER

[75] Inventors: Dalton H. Pritchard; Walter E. Sepp, both of Princeton, N.J.; William A. Lagoni, Indianapolis, Ind.

[73] Assignee: RCA Corporation, New York, N.Y.

[21] Appl. No.: 38,291

[22] Filed: May 11, 1979

[51] Int. Cl.[2] .................. H04N 9/535; H03B 19/14
[52] U.S. Cl. ........................ 358/31; 328/16; 331/76
[58] Field of Search ............ 358/31; 328/16, 17, 328/18, 167; 307/271, 295; 331/53, 76; 363/163; 330/293

[56] References Cited

U.S. PATENT DOCUMENTS

| 4,019,118 | 4/1977 | Harwood | 363/163 |
|---|---|---|---|
| 4,110,784 | 8/1978 | Amery et al. | 358/8 |
| 4,130,765 | 12/1978 | Arakelian | 328/16 |

OTHER PUBLICATIONS

*Transistor Circuit Design*, section 23.2, "Frequency Doublers", pp. 326-328, Texas Instruments Inc., publ. by McGraw-Hill, 1963.

*Primary Examiner*—John C. Martin
*Attorney, Agent, or Firm*—Eugene M. Whitacre; William H. Meagher

[57] ABSTRACT

Frequency multiplier includes common-emitter input amplifying stage receiving fundamental frequency input signals at input transistor base. Output amplifying stage has output transistor with its base linked to input transistor collector, and with its collector coupled to narrow band load circuit tuned to a selected harmonic frequency. Emitter circuit of output transistor includes parallel resonant circuit tuned to input signal fundamental frequency. Non-linear negative feedback path between output transistor emitter and input transistor base includes capacitor in series with paralleled, oppositely poled diodes.

5 Claims, 1 Drawing Figure

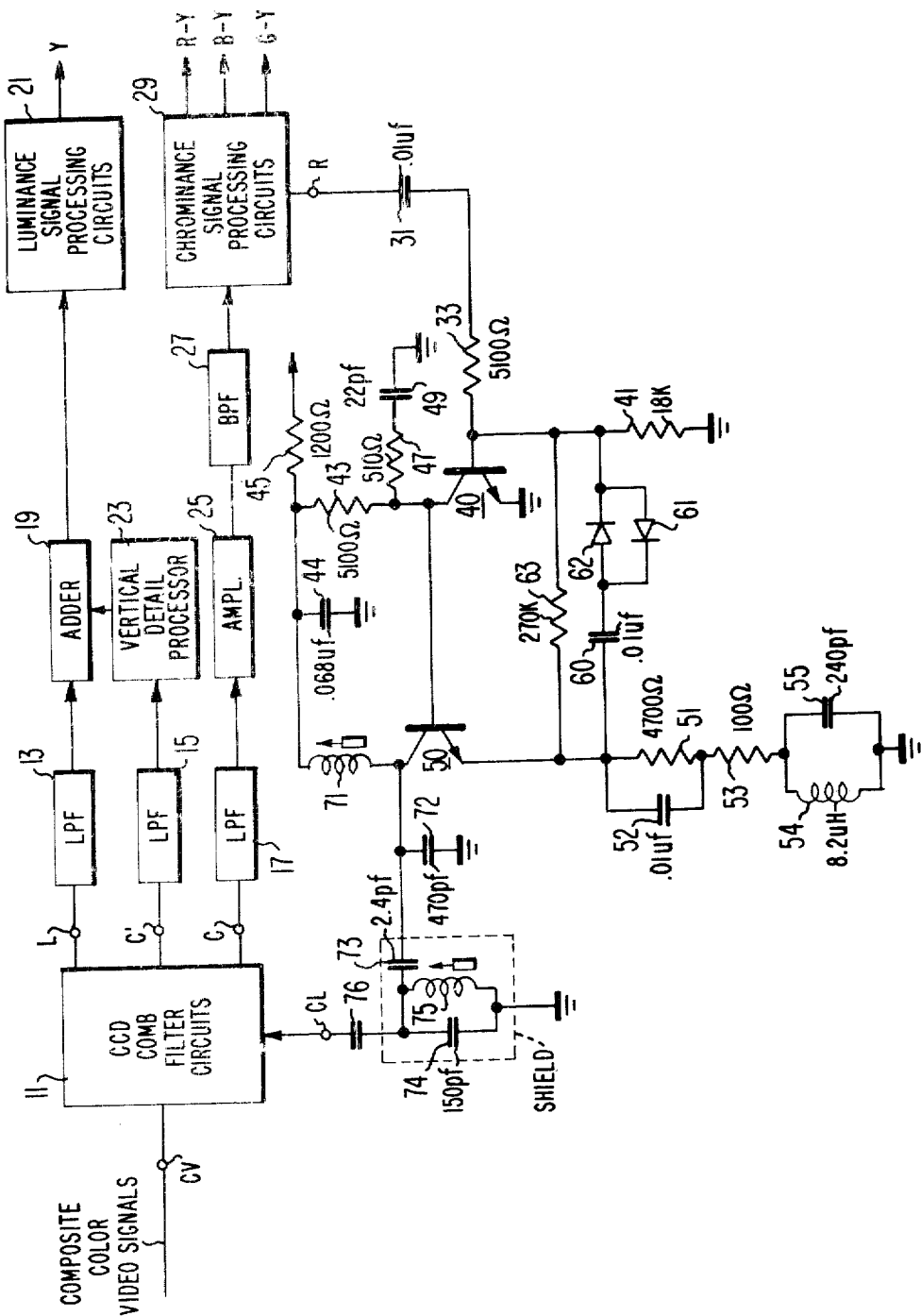

FREQUENCY MULTIPLIER FOR USE WITH CCD COMB FILTER

The present invention relates generally to frequency multiplier circuits, and particularly to frequency multiplier circuits of a novel and advantageous form for obtaining, from a reference input of a given fundamental frequency, a high level output at a selected harmonic of said given fundamental frequency which is substantially free of accompanying components at said fundamental frequency and undesired harmonics thereof.

In U.S. Pat. No. 4,096,516—Pritchard, a charge coupled device (CCD) comb filter arrangement is described which is particularly well suited for separating the luminance and chrominance signal components of a composite color television signal. Parallel signal paths formed by long and short CCD delay lines, using a common clock drive and terminating in a common charge summer, are provided. In an illustrative embodiment suitable for processing standard NTSC broadcast signals, clocking at a frequency equal to three times the color subcarrier frequency (i.e., equal to $3 \times 3.579545$ MHz., or 10.738635 MHz.) is employed to control charge transfer in a long, two phase delay line of $683\frac{1}{2}$ stages and a pair of short, two phase delay lines of one stage each. Summing of charge transferred by the long delay line and one of the short delay lines is used to obtain a first comb filter characteristic exhibiting regularly spaced rejection notches at odd integral multiples of half the line frequency; a combed luminance signal is derived from the output of the first charge summer. Summing of charge transferred by the long delay line and by the other of the short delay lines (the input of which is subject to phase inversion) is used to obtain a second comb filter characteristic exhibiting regularly spaced rejection notches at even integral multiples of half the line frequency. With suitable bandpass filtering, a combed chrominance signal is derived from an output of the second charge summer. With suitable lowpass filtering, a vertical detail signal is also derived from an output of the second charge summer for recombination with the combed luminance signal derived from the first charge summer.

In the chrominance signal processing circuitry of the color television receiver, to which the combed chrominance signal is applied, a reference color subcarrier frequency signal is generated by means of a crystal oscillator that is phase-locked to the color synchronizing burst component of the incoming signal. Thus, there is available in the receiver a continuous reference signal of high frequency accuracy. By use of frequency multiplication techniques, one can derive from such a reference a signal of the multiple frequency required for clocking, which signal may be applied to control the clock drive circuits of the charge coupled device.

However, it has been found that, for proper operation of a color television receiver incorporating a CCD comb filter arrangement of the type described above, severe requirements with respect to fundamental frequency rejection must be met by the frequency multiplier circuits providing the output controlling the clock drive circuits of the charge coupled device. Relatively small amounts of stray oscillations at the color subcarrier frequency, if coupled into the combed chrominance signal output of the CCD comb filter, can introduce adverse effects in the color synchronizing, automatic chroma control, and color killer circuits of the chrominance signal processor, and can additionally associate undesired disturbances of color balance with tint control operation. Illustratively, to assure avoidance of such adverse effects, it appears desirable that the level of stray oscillations accompanying the combed chrominance signal output be at least 65 db. down relative to the chrominance signal level.

The present invention is directed to a frequency multiplier circuit of a novel form providing a high degree of relative attenuation of the input fundamental frequency. In an illustrative realization of the novel frequency multiplier for the above-described clock control purposes, an output at the desired clock frequency of 10.738635 MHz., with a level suitable for application to the CCD clock drive circuits, was obtained with fundamental frequency component accompaniment at a level approximately 80 db. lower.

In accordance with the principles of the present invention, a frequency multiplier includes an input amplifying stage employing a first transistor disposed in common-emitter configuration, with input signals of a fundamental frequency applied to the base thereof. The output of the first amplifying stage, appearing at the collector of the first transistor, is applied to the base of a second transistor, which serves as the active device of an output amplifying stage. A non-linear signal feedback path is disposed between the emitter of the second transistor and the base of the first transistor and is configured so as to exhibit a relatively high impedance during zero crossovers of the input signal and to exhibit a relatively low impedance during intervals intervening said zero crossovers. The collector of the second transistor is provided with a tuned collector load comprising a parallel resonant circuit tuned to a desired odd harmonic of the input signal fundamental frequency. Return of the emitter of the second transistor to a point of reference potential is effected via a parallel resonant circuit tuned to the input signal fundamental frequency. The latter resonant circuit serves the dual purposes of providing frequency selective degeneration for the output amplifying stage (maximizing at the input signal fundamental frequency), and providing frequency selectivity for the negative feedback looped around the input amplifying stage during said intervening intervals (which is also maximized at said input signal fundamental frequency).

In a preferred embodiment of the present invention, the non-linear signal feedback path comprises a pair of paralleled, oppositely poled diodes, with a capacitor in series with the parallel combination of diodes. A resistor shunts such feedback path to provide DC feedback for transistor operating point stabilization. Output filtering is completed by an additional parallel resonant circuit tuned to the selected harmonic and capacitively coupled to the harmonically tuned collector load circuit.

In the sole FIGURE of the accompanying drawing, a portion of a color television receiver is illustrated, partially schematically and partially by block diagram representation, in which frequency multiplier apparatus in accordance with an illustrative embodiment of the present invention is employed for clock signal generation purposes.

In the illustrated arrangement, composite color video signals, developed, for example, by the video detector of a color television receiver, are applied to the composite video input terminal CV of CCD comb filter circuitry 11, illustratively of the general type shown in the aforementioned Pritchard patent. Signals which have been subject to a first comb filter characteristic exhibiting regularly spaced rejection notches at odd integral multiples of half the line frequency appear at output terminal L of the comb filter circuits 11, and are applied to a low pass filter 13. Low pass filter 13 with an illustrative passband of 0 to 4 MHz., rejects high frequency components associated with the CCD clocking signals, and passes a wideband combed luminance signal.

Signals which have been subject to a second comb filter characteristic exhibiting regularly spaced rejection notches at even integral multiples of half the line frequency appear at output terminals C and C' of the comb filter circuits 11. The signals appearing at terminal C are applied to a low pass filter 17, which rejects high frequency components associated with the clocking signals. The output of low pass filter 17, after amplification by amplifier 25, is applied to a bandpass filter 27, with an illustrative passband of 3-4 MHz., providing a combed chrominance signal at its output.

The signals appearing at terminal C' are applied to a low pass filter 15, with a passband (e.g., 0 to 2 MHz.) suitable for passing vertical detail information while rejecting the combed chrominance signal, as well as high frequency components associated with the clocking signals. The output of low pass filter 15 is supplied to a vertical detail signal processor 23, which supplies vertical detail information to adder 19 for combination with the combed luminance signal output of low pass filter 13. Where simple vertical detail restoration is desired, the processor 23 supplies the vertical detail information at a level matching that of the interleaved low frequency components of the combed luminance signal. Where vertical peaking effects are desired, level enhancement for the vertical detail information is provided by processor 23. In the latter instance, the processor circuits are desirably of a form providing a non-linear amplitude characteristic, whereby small excursions of the vertical detail signal are subject to a gain of restoration level, intermediate magnitude excursions are subject to a gain exceeding restoration level, and peak excursions are subject to a gain less than restoration level, as described, for example, in the copending U.S. patent application Ser. No. 38,105 of W. Lagoni, entitled "Controllable Non-Linear Processing of Video Signals".

The output of adder 19, comprising a combed luminance signal with restored or enhanced vertical detail information, is supplied to luminance signal processing circuits 21. The output of bandpass filter 27, comprising a combed chrominance signal, is supplied to chrominance signal processing circuits 29. The processing circuits 21, 29 develop, in conventional manner, respective outputs (Y; R-Y, G-Y, and B-Y) for application to a conventional matrix (not illustrated) to obtain respective red, green and blue color signals for color image reproduction purposes.

At terminal R of the chrominance signal processing circuits 29 appears reference oscillations of color subcarrier frequency (e.g., 3.579545 MHz.). Illustratively, these are developed in a conventional manner by a crystal controlled oscillator phase-locked to the color synchronizing burst component of the incoming signals.

The reference oscillations from terminal R are applied via a coupling capacitor 31 in series with resistor 33 to the base of a first NPN transistor 40, disposed in a common-emitter amplifier configuration, with its emitter connected directly to a point of reference potential (e.g., ground), its collector connected via a load resistor 43 in series with a supply dropping resistor 45 to the positive terminal of an operating potential supply, and its base electrode returned to the grounded reference potential point via a resistor 41. The collector of the input transistor 40 is directly connected to the base of a second NPN transistor 50, serving as the active device of an output amplifying stage.

A DC path from the emitter of transistor 50 to the grounded reference potential point is provided by the series connection of resistor 51, resistor 53 and inductor 54. A large-valued capacitor 52, in shunt with resistor 51, bypasses resistor 51 for signal frequencies. A capacitor 55, in shunt with inductor 54, forms therewith a first parallel resonant circuit tuned to the input signal fundamental frequency (i.e., to 3.579545 MHz.).

A tuned collector load circuit for transistor 50 is provided by a second parallel resonant circuit, tuned to a desired odd multiple harmonic of the input signal fundamental frequency (e.g., to the third harmonic frequency of 10.738635 MHz.) and formed by capacitor 72 coupled between the collector of transistor 50 and the grounded reference potential point and inductor 71 disposed between said collector and the junction of resistors 43 and 45. The resistor junction is bypassed to the grounded reference potential point by capacitor 44. A third parallel resonant circuit also tuned to the third harmonic frequency of 10.738635 MHz., is formed by inductor 75 and capacitor 74 coupled in parallel between capacitor 76 linked to clock input terminal CL of comb filter circuits 11 and the grounded reference potential point. A capacitor 73 links the second and third parallel resonant circuits.

An AC path for non-linear negative feedback of signals between the emitter of transistor 50 and the base of transistor 40 is formed by blocking capacitor 60 in series with the parallel combination of oppositely poled diodes 61, 62. A large-valued resistor 63, in shunt with said AC feedback path, provides a DC feedback path for transistor operating point stabilization. The series combination of a resistor 47 and a capacitor 49 is coupled between the collector of transistor 40 and the grounded reference potential point for conventional stability purposes.

In the described arrangement, during zero crossovers of the input signal, gain of the input amplifying stage is high due to the high impedance exhibited by the diodes 61, 62 in the feedback path, whereas, during intervals intervening said zero crossovers gain of the input amplifying stage is low due to the strong negative feedback provided via the conducting diodes and maximized at the fundamental frequency by the impedance characteristic of the fundamental tuned resonant circuit. As a consequence, the output of the input amplifying stage is rich in odd harmonics. Appreciable gain for the selected one of said harmonics is provided in the output amplifying stage to the relative exclusion of other odd harmonics due to the high impedance provided at the selected harmonic frequency by the narrow band tuned collector load circuit. Relative attenuation of the fundamental component is assured by the frequency selective degeneration introduced in the output amplifying stage by resonant circuit 54, 55 in the emitter circuit which maximizes degeneration at the fundamental frequency.

As an alternative to the illustrated AC signal feedback path arrangement, capacitor 60 and resistor 63 may be eliminated, leaving the parallel combination of diodes 61, 62 DC connected between the emitter of transistor 50 and the base of transistor 40. However, the illustrated arrangement is preferred for its assurance of optimum even harmonic rejection in the presence of less than optimum matching of diodes 61 and 62.

What is claimed is:

1. Frequency multiplier apparatus comprising, in combination:
    a first amplifying stage including a first transistor having base, emitter and collector electrodes and disposed in a common-emitter amplifier configuration;
    means for applying input signals of a given frequency to the base electrode of said first transistor;
    a second transistor having a base, emitter and collector electrodes;
    means for coupling the collector electrode of said first transistor to the base electrode of said second transistor;
    a first parallel resonant circuit tuned to said given frequency and coupled between said emitter electrode of said second transistor and a point of reference potential;
    a signal feedback path coupled between the emitter electrode of said second transistor and the base electrode of said first transistor, said signal feedback path exhibiting a relatively high impedance during zero crossovers of said input signals and a relatively low impedance during intervals intervening said zero crossovers of said input signals; and
    a narrow-band, frequency selective load circuit for said second transistor coupled to the collector electrode of said second transistor and including a second parallel resonant circuit tuned to a selected harmonic of said given frequency, said selected harmonic frequency corresponding to a given odd integral multiple, different from one, of said given frequency.

2. Apparatus in accordance with claim 1 wherein said signal feedback path includes:
    a pair of paralleled, oppositely poled diodes disposed between said emitter electrode of said second transistor and said base electrode of said first transistor.

3. Apparatus in accordance with claim 1 wherein said signal feedback path includes:
    a capacitor; and
    the parallel combination of first and second diodes disposed in parallel with opposite poling;
    said capacitor being coupled in series with said parallel combination between said emitter electrode of said second transistor and said base electrode of said first transistor.

4. Apparatus in accordance with claim 3 also including a third parallel resonant circuit tuned to said selected harmonic frequency, and means for capacitively coupling said second parallel resonant circuit to said third parallel resonant circuit.

5. In a color television receiver including clocked CCD comb filter circuits for separating luminance and chrominance signal components of received composite color television signals, and chrominance signal processing circuits responsive to the chrominance signal component separated by said comb filter circuits; said chrominance signal processing circuits including means for developing reference signals of color subcarrier frequency; clock signal generating means comprising:
    a first transistor having base, emitter and collector electrodes and disposed in a common-emitter amplifier configuration;
    means for applying said reference signals to the base electrode of said first transistor;
    a second transistor having base, emitter and collector electrodes;
    means for coupling the collector electrode of said first transistor to the base electrode of said second transistor;
    a first parallel resonant circuit tuned to said color subcarrier frequency and coupled between said emitter electrode of said second transistor and a point of reference potential;
    a signal feedback path coupled between the emitter electrode of said second transistor and the base electrode of said first transistor, said signal feedback path exhibiting a relatively high impedance during zero crossovers of said reference signals and a relatively low impedance during intervals intervening said zero crossovers of said reference signals; and
    a frequency selective load circuit for said second transistor coupled to the collector electrode of said second transistor and including a second parallel resonant circuit tuned to the third harmonic of said color subcarrier frequency;
    means for deriving clock signals, for controlling the clocking of said CCD comb filter circuits, from said frequency selective load circuit.

* * * * *